United States Patent [19]

Okada et al.

[11] Patent Number: 4,985,074

[45] Date of Patent: Jan. 15, 1991

[54] PROCESS FOR PRODUCING A DESULFURIZATION AGENT

[75] Inventors: Osamu Okada, Osakasayama; Susumu Takami, Osaka; Tamotu Kotani, Soraku; Satoshi Mori, Fujiidera; Hiroki Fujita, Nishinomiya; Naoko Fukumura, Fujiidera; Masamichi Ippommatsu, Nishinomiya, all of Japan

[73] Assignee: Osaka Gas Company Limited, Osaka, Japan

[21] Appl. No.: 264,313

[22] Filed: Oct. 31, 1988

[30] Foreign Application Priority Data

Nov. 5, 1987 [JP] Japan .................................. 62-279867
Nov. 5, 1987 [JP] Japan .................................. 62-279868

[51] Int. Cl.$^5$ ............................ C22B 1/00; C22C 1/04
[52] U.S. Cl. ..................................................... 75/444
[58] Field of Search ................... 75/0.5 A, 58, 53, 444

[56] References Cited

U.S. PATENT DOCUMENTS 3,053,648  9/1962  Stephens ............................. 75/26
3,107,995 10/1963  Katakura ............................. 75/58

*Primary Examiner*—Peter D. Rosenberg
*Attorney, Agent, or Firm*—Larson and Taylor

[57] ABSTRACT

The present invention provides (1) a process for producing a desulfurization agent which comprises subjecting to hydrogen reduction a copper oxide-zinc oxide mixture prepared by co-precipitation process using a copper compound and a zinc compound; and (2) a process for producing a high temperature-resistant, high grade desulfurization agent which comprises subjecting to hydrogen reduction a copper oxide-zinc oxide-aluminum oxide mixture prepared by a co-precipitation process using a copper compound, a zinc compound and an aluminum compound.

13 Claims, No Drawings 4,985,074

PROCESS FOR PRODUCING A DESULFURIZATION AGENT

TECHNICAL FIELD

The present invention relates to a process for producing a desulfurization agent for gases and oils.

PRIOR ART AND PROBLEMS THEREOF

Copper is heretofore known as having excellent performances as a desulfurization agent and is usually used as supported by a carrier such as active carbon, alumina, zinc oxide or the like.

However, since conventional copper-based desulfurization agents have a low capacity for adsorbing sulfur, a long-period desulfurization requires a large quantity thereof and they entail difficulty in bringing about stable desulfurization to a low level of 1 ppb or below.

MEANS OF SOLVING THE PROBLEMS

In view of the abovementioned problems in the copper-based desulfurization agents, the present inventors have made extensive research and found that the desulfurization agent obtained by subjecting to hydrogen reduction a copper oxide-zinc oxide mixture or a copper oxide-zinc oxide-aluminum oxide mixture produced by co-precipitation process can when used reduce the sulfur content in gases and oils to a level of 0.1 ppb or below.

According to the present invention, there is provided a process for producing a desulfurization agent which comprises subjecting to hydrogen reduction a copper oxide-zinc oxide mixture prepared by a co-precipitation process using a copper compound and a zinc compound (hereinafter referred to as "first process of the invention").

According to the invention there is also provided a process for producing a desulfurization agent which comprises subjecting to hydrogen reduction a copper oxide-zinc oxide-aluminum oxide mixture prepared by a co-precipitation process using a copper compound, a zinc compound and an aluminum compound (hereinafter referred to as "second process of the invention").

The first process and the second process of the invention will be described below in greater detail.

I. FIRST PROCESS OF THE INVENTION

In the first process of the invention, first a copper oxide-zinc oxide mixture is prepared by a co-precipitation process. The copper compounds for use as a copper source include water-soluble copper compounds such as nitrate, acetate, etc. The zinc compounds for use as a zinc source include water-soluble zinc compounds such as nitrate, acetate, etc. The co-precipitation can be conducted by processes similar to those conventionally employed in the production of catalysts. For example, a mixed aqueous solution having dissolved therein a copper compound and a zinc compound and an aqueous solution of sodium carbonate are simultaneously added dropwise at a constant rate to pure water maintained at about 80° C. with stirring while neutralizing the mixture, whereby a slurry is formed. Then the formed precipitate is washed, dried at about 110° to about 120° C., compression-molded after addition, if necessary, of an auxiliary and calcined at about 300° C. These conditions may be optionally selected according to the kind of the copper compound and the zinc compound used, without particular limitation. The copper oxide-zinc oxide mixture obtained above has the two components homogeneously mixed and finely dispersed with one other. The mixing ratio of copper oxide and zinc oxide can be varied over an extensive range. Usually a preferred copper-zinc ratio is 1: about 0.3-10 (molar ratio). When the amount of zinc is too small, sintering of copper cannot be effectively prevented. On the other hand, when the amount of zinc is too large, the desulfurization performance of copper-based catalyst is not sufficiently exhibited. Subsequently the obtained copper oxide-zinc oxide mixture is subjected to hydrogen reduction under specific conditions. Since copper has a low melting point, heat tends to give an increased particle size and thus a decreased surface area, and excessive heat transforms the pore structure, so that its characteristics as a catalyst are changed. Consequently in the first process of the invention, the hydrogen reduction, an exothermic reaction, of copper oxide is carried out in the presence of a gas mixture of an inert gas (e.g., nitrogen) and a hydrogen having a hydrogen content of not more than 6% by volume, preferably about 0.5 to about 4% by volume, while maintaining the temperature at about 150° to about 300° C.

The copper particles in the desulfurization agent obtained by the first process, which each have a large surface area, are uniformly dispersed in the zinc oxide and rendered highly active by the chemical interaction with the zinc oxide so that the desulfurization agent is afforded a greater and more effective sulfur adsorbing capacity. In consequence, the obtained desulfurization agent has a greater desulfurization capacity than known copper-based desulfurization agents.

II. SECOND PROCESS OF THE INVENTION

In the second process of the invention, first a copper oxide-zinc oxide-aluminum oxide mixture is prepared by a co-precipitation process. The copper compounds for use as a copper source include water-soluble copper compounds such as nitrate, acetate, etc. The zinc compounds for use as a zinc source include water-soluble zinc compounds such as nitrate, acetate, etc. Examples of aluminum source include water-soluble aluminum compounds such as nitrate, sodium aluminate, etc. The co-precipitation can be carried out by processes similar to those conventionally employed in the production of catalysts. For example, a mixed aqueous solution having dissolved therein a copper compound, a zinc compound and an aluminum compound and an aqueous solution of sodium carbonate are simultaneously added dropwise at a constant rate to pure water maintained at about 80° C. with stirring while neutralizing the mixture, whereby a slurry is formed. Then the formed precipitate is washed, dried at about 110° to about 120° C., compression-molded after addition, if necessary, of an auxiliary and calcined at about 400° C. These conditions may be optionally selected according to the kind of each compound used, without particular limitation. The copper oxide-zinc oxide-aluminum oxide mixture obtained above has the three components homogeneously mixed and finely dispersed with one another. The mixing ratio of copper oxide, zinc oxide and aluminum oxide used can be varied over an extensive range. Usually a preferred copper-zinc-aluminum ratio is 1: about 0.3-10: about 0.05-2 (molar ratio). When the amount of zinc is too small, sintering of copper cannot be effectively prevented. On the other hand, when the amount of zinc is too large, the desulfurization performance of copper-based catalyst is not sufficiently exhibited. When the amount of aluminum is too small, the Cu-ZnO structure cannot be stabilized. On the other hand, when the amount of aluminum is too large, the desulfurization effect is lowered. Then the obtained copper oxide-zinc oxide-aluminum oxide mixture is subjected to hydrogen reduction under specific conditions. Since copper has a low melting point, heating tends to result in increased particle size and decreased surface area, and excessive heating transforms its pore structure so that the characteristics as a catalyst are largely changed. Consequently in the second process of the invention, hydrogen reduction, an exothermic reaction, of copper oxide is carried out in the presence of a hydrogen gas diluted with an inert gas (e.g., nitrogen) to a hydrogen content of not more than 6% by volume, preferably about 0.5 to about 4% by volume, while maintaining the temperature at about 150° to about 300° C.

The copper particles in the desulfurization agent obtained by the second process, which each have a large surface area, are uniformly dispersed in the zinc oxide and the aluminum oxide and rendered highly active by the chemical interaction with the zinc oxide so that the desulfurization agent is afforded an extremely effective and great sulfur adsorbing capacity. Further, due to the action of the aluminum oxide, the mixture per se is imparted an improved strength and the loss of strength and the loss of sulfur adsorbing capacity at a high temperature are significantly diminished. Consequently the obtained desulfurization agent is given a further greater desulfurization capacity than conventional copper-based desulfurization agents.

The desulfurization agents of the present invention are each used in the same manner as known adsorption-type desulfurization agents, for example, by being filled into an adsorption desulfurization apparatus of specific shape and passing therethrough the gas or the oil to be purified. Since the desulfurization agent of the invention has an adsorbing capacity improved to such extent as to be unattainable by conventional adsorbing agents, it exhibits a particularly remarkable effect in use as a "secondary desulfurization agent" for performing a further desulfurization after the conventionally highest possible degree of desulfurization has been attained by the usual method.

The desulfurization using the desulfurization agent obtained in the first process of the invention may be performed, if necessary, with heating for example to about 150° to about 300° C.

The desulfurization using the desulfurization agent of the second process, may be performed, if necessary, with heating for example to about 150° to about 400° C.

RESULTS OF THE INVENTION

The desulfurization agent of this invention can lower the contents of organic and inorganic sulfurs in gases and oils to a level of 0.1 ppb or below. Moreover, its effect is sustained for a long period of time.

Especially, the desulfurization agent obtained in the second process of the invention exhibits a remarkably improved stability even at high temperatures upto 400° C.

EXAMPLES

The features of the present invention will be further clarified by the following Reference Examples, Examples, and Comparative Examples.

REFERENCE EXAMPLE 1

According to conventional procedure, a coke oven gas having a sulfur content of 200 ppm (sulfur concentration by weight, hereinafter the same) was subjected to hydrocracking in the presence of an Ni-Mo hydrogenating desulfurization catalyst under the conditions of temperature of 380° C., pressure of 8 $kg/cm^2$.G, and SV 1000, and was brought into contact with a ZnO adsorbing desulfurization agent to undergo desulfurization. The concentration of the sulfur compounds in the resulting purified gas was about 0.1 ppm, namely the highest desulfurization level attainable by currently available gas purification techniques.

EXAMPLE 1

To a mixed aqueous solution having dissolved therein copper nitrate and zinc nitrate, sodium carbonate was added as an alkali compound, and the formed precipitate was washed and filtered. The precipitate was formed into a tablet measuring ⅛ inch in thickness and ⅛ inch in diameter, and calcined at about 300° C. The calcined product contained copper and zinc in a ratio of 1:1 (molar ratio).

A nitrogen gas containing 2% hydrogen was passed through a secondary desulfurization apparatus (30 cm in length of the desulfurization layer) packed with 100 cc of said calcined product to perform reduction at a temperature of 200° C. The purified coke oven gas obtained in Reference Example 1 was passed through the desulfurization apparatus at a rate of 4000 l/hr to undergo desulfurization again under the conditions of temperature of 250° C. and pressure of 8 $kg/cm^2$.G.

As a result, the sulfur compound concentration in the finally obtained purified gas was lowered to a level not exceeding 0.1 ppb on the average in the course of 10000 hours' operation.

COMPARATIVE EXAMPLE 1

Using a desulfurization agent having 5% copper supported on an active alumina carrier (surface area, 100 $m^2/g$) in place of the desulfurization agent of Example 1, a secondary desulfurization similar to that of Example 1 was carried out whereupon immediately after the start of operation, the sulfur compound started to slip. Finally 0.05 ppm sulfur compound was detected in the purified gas.

REFERENCE EXAMPLE 2

According to conventional procedure, LPG having a sulfur content of 20 ppm was first subjected to hydrocracking in the presence of an Ni-Mo hydrogenating desulfurization catalyst under the conditions of temperature of 380° C., pressure of 10 $kg/cm^2$.G, LSV 1, and a hydrogen/LPG ratio of 0.1 (molar ratio), and was brought into contact with a ZnO adsorbing desulfurization agent to undergo desulfurization. The concentration of sulfur compound in the resulting purified gas was about 0.05 ppm.

EXAMPLE 2

The purified gas obtained in Reference Example 2 was subjected to the same secondary desulfurization as in Example 1.

As a result, the concentration of sulfur compound in the finally obtained purified gas was at all times at the level not exceeding 0.1 ppb during 1000 hours of operation.

REFERENCE EXAMPLE 3

According to conventional procedure, naphtha having a sulfur content of 100 ppm was first subjected to hydrocracking in the presence of an Ni-Mo hydrogenating desulfurization catalyst under the conditions of temperature of 380° C., pressure of 10 kg/cm$^2$.G, LSV 1 and a hydrogen/naphtha ratio of 0.1 (molar ratio), and was brought into contact with a ZnO adsorbing desulfurization agent to undergo desulfurization. The concentration of sulfur compound in the resulting purified gas was about 0.2 ppm.

EXAMPLE 3

The purified gas obtained in Reference Example 3 was subjected to the same secondary desulfurization as in Example 1.

As a result, the concentration of sulfur compound in the finally obtained purified gas was at the level of not exceeding 0.1 ppb even after 1000 hours of operation.

COMPARATIVE EXAMPLE 2

Using a desulfurization agent having 5% copper supported on an active alumina carrier (surface area, 100 m$^2$/g) in place of the desulfurization agent of Example 3, a secondary desulfurization similar to that of Example 3 was carried out whereupon immediately after the start of operation, the sulfur compound started to slip. Finally 0.1 ppm sulfur compound was detected in the purified gas. This value increased to 0.2 ppm two days later.

COMPARATIVE EXAMPLE 3

In the reduction process of Example 1, a pure hydrogen gas was used in place of the nitrogen containing 2% hydrogen to obtain a desulfurization agent.

Using the obtained desulfurization agent, the secondary desulfurization of naphtha was effected in the same manner as in Example 3, whereby a 0.1 ppm sulfur compound was detected from the purified naphtha three days after the start of operation. The amount of the sulfur compound gradually increased thereafter.

EXAMPLE 4

To a mixed aqueous solution having dissolved therein copper nitrate, zinc nitrate and aluminum nitrate, sodium carbonate was added as an alkali compound, and the formed precipitate was washed and filtered. The precipitate was formed into a tablet measuring ⅛ inch in thickness and ⅛ inch in diameter, and calcined at about 400° C.

A nitrogen gas containing 2% hydrogen was passed through a secondary desulfurization apparatus (30 cm in length of the desulfurization layer) packed with 100 cc of said calcined product (containing 45% copper oxide, 45% zinc oxide, and 10% aluminum oxide) for reduction at a temperature of 200° C. The purified coke oven gas obtained in Reference Example 1 was passed through said desulfurization apparatus at a rate of 4000 l/hr to undergo secondary desulfurization under the conditions of temperature of 350° C. and pressure of 8 kg/cm$^2$.G.

As a result, the sulfur compound concentration in the finally obtained purified gas was lowered to a level not exceeding 0.1 ppb on the average in the course of 7000 hours' operation.

The strength of the desulfurization agent was lowered from 60 kg before use to 40 kg 100 hours later, but the strength of 40 kg was maintained even after 7000 hours.

COMPARATIVE EXAMPLE 4

A desulfurization agent was prepared by carrying out the same procedure as in Example 4 with the exception of not using aluminum nitrate. The calcination temperature was 300° C.

When the obtained desulfurization agent was used in the same manner as in Example 4, the sulfur compound concentration in the finally obtained purified gas was not more than 0.1 ppb, but the strength of the desulfurization agent standing at 30 kg before use was 2 kg in 100 hours and was lowered to 1 kg in 300 hours.

The above results show that this comparative product is not suited for use at a high temperature of 300° C. or above.

EXAMPLE 5

The purified gas obtained in Reference Example 2 was subjected to the same secondary desulfurization as in Example 4.

As a result, the concentration of sulfur compound in the finally obtained purified gas was at all times at the level not exceeding 0.1 ppb over 1000 hours' operation.

The strength of the desulfurization agent standing at 60 kg before use was 40 kg after 100 hours, and was remained at 40 kg even after 1000 hours.

EXAMPLE 6

The purified gas obtained in Reference Example 3 was subjected to the same secondary desulfurization as in Example 4.

As a result, the concentration of sulfur compound in the finally obtained purified gas was at the level not exceeding 0.1 ppb even after 1000 hours' operation.

The strength of the desulfurization agent registering 60 kg before use was 40 kg after 100 hours, and remained at 40 kg even after 1000 hours.

COMPARATIVE EXAMPLE 5

A desulfurization agent was obtained in the same manner as in Example 4 with the exception of not using aluminum nitrate. The calcination temperature was 300° C.

When the obtained desulfurization agent was used in the same manner as in Example 6, the sulfur compound concentration in the finally obtained purified gas was not more than 0.1 ppb, but the strength of the desulfurization agent standing at 30 kg before use was 1 kg in 100 hours and was lowered to not more than 1 kg in 300 hours.

The above results show that this comparative product is also not suited for use at a high temperature of 300° C. or above.

EXAMPLE 7

A desulfurization agent was obtained in the same manner as in Example 1 with the exception of the copper-zinc ratio of 1:2.3 (molar ratio).

When the obtained desulfurization agent was used in the same manner as in Example 1, the sulfur compound concentration in the finally obtained purified gas was not more than 0.1 ppb even after 10000 hours' operation.

EXAMPLE 8

A desulfurization agent was obtained in the same manner as in Example 1 with the exception of the copper-zinc ratio of 1:0.5 (molar ratio).

When the obtained desulfurization agent was used in the same manner as in Example 1, the sulfur compound concentration in the finally obtained purified gas was not more than 0.1 ppb even after 1000 hours' operation.

EXAMPLE 9

A desulfurization agent was obtained in the same manner as in Example 1 with the exception of the copper-zinc ratio of 1:2.3 (molar ratio).

When the obtained desulfurization agent was used in the same manner as in Example 3, the sulfur compound concentration in the finally obtained purified gas was not more than 0.1 ppb even after 1000 hours' operation.

EXAMPLE 10

A desulfurization agent was obtained in the same manner as in Example 4 with the exception of the copper-zinc-aluminum ratio of 1:3:1 (molar ratio).

When the obtained desulfurization agent was used in the same manner as in Example 4, the sulfur compound concentration in the finally obtained purified gas was not more than 0.1 ppb even after 4000 hours' operation.

The strength of the desulfurization agent standing at 80 kg before use was 60 kg after 100 hours, and was remained at 60 kg even after 4000 hours.

EXAMPLE 11

A desulfurization agent was obtained in the same manner as in Example 4 with the exception of the copper-zinc-aluminum ratio of 1:3:1 (molar ratio).

When the obtained desulfurization agent was used in the same manner as in Example 6, the sulfur compound concentration in the finally obtained purified gas was not more than 0.1 ppb even after 1000 hours' operation.

The strength of the desulfurization agent standing at 80 kg before use was 60 kg after 100 hours, and was remained at 60 kg even after 1000 hours.

EXAMPLE 12

A desulfurization agent was obtained in the same manner as in Example 4 with the exception of the copper-zinc-aluminum ratio of 1:0.6:0.3 (molar ratio).

When the obtained desulfurization agent was used in the same manner as in Example 6, the sulfur compound concentration in the finally obtained purified gas was not more than 0.1 ppb even after 1000 hours' operation.

The strength of the desulfurization agent standing at 40 kg before use was 20 kg after 100 hours, and was remained at 18 kg even after 1000 hours.

We claim:

1. A process for producing a desulfurization agent which comprises:
    (a) mixing an aqueous solution having dissolved therein a copper compound and a zinc compound with an aqueous alkali solution to neutralize the mixture and to form a copper compound-zinc compound coprecipitate,
    (b) calcining the coprecipitate to obtain a copper oxide-zinc oxide mixture, and
    (c) reducing the mixture in the presence of hydrogen.

2. A process for producing a desulfurization agent which comprises:
    (a) mixing an aqueous solution having dissolved therein a copper compound, a zinc compound and an aluminum compound with an aqueous alkali solution to neutralize the mixture and to form a copper compound-zinc compound-aluminum compound coprecipitate,
    (b) calcining the coprecipitate to obtain a copper oxide-zinc oxide-aluminum oxide mixture, and
    (c) reducing the mixture in the presence of hydrogen.

3. The process according to claim 1 wherein the hydrogen reduction is carried out at about 150° to about 300° C. by using a dilute hydrogen gas having a hydrogen concentration of not higher than 6%.

4. The process according to claim 1 wherein the copper compound is at least one of copper nitrate and copper acetate.

5. The process according to claim 1 wherein the zinc compound is at least one of zinc nitrate and zinc acetate.

6. The process according to claim 1 wherein the the copper oxide and and zinc oxide are used in a copper-zinc ratio of 1: about 0.3–10 (molar ratio).

7. The process according to claim 1 wherein a hydrogen-inert gas mixture having a hydrogen concentration of about 0.5 to about 4% by volume is subjected to hydrogen reduction.

8. The process according to claim 2 wherein the hydrogen reduction is carried out at about 150° to about 300° C. by using a dilute hydrogen gas having a hydrogen concentration of not higher that 6%.

9. The process according to claim 2 wherein the copper compound is at least one of copper nitrate and copper acetate.

10. The process according to claim 2 wherein the zinc compound is at least one of zinc nitrate and zinc acetate.

11. The process according to claim 2 wherein the aluminum compound is at least one of aluminum nitrate and sodium aluminate.

12. The process according to claim 2 wherein the copper oxide, zinc oxide and aluminum oxide are used in a copper-zinc-aluminum ratio of 1: about 0.3–10: about 0.05–2 (molar ratio).

13. The process according to claim 2 wherein a hydrogen-inert gas mixture having a hydrogen concentration of about 0.5 to about 4% by volume is subjected to hydrogen reduction.

* * * * *